Dec. 15, 1942.　　　J. D. HASSETT　　　2,305,527
STEERING WHEEL SPINNER
Filed March 27, 1941　　　2 Sheets-Sheet 1

Inventor
James Dunlap Hassett

By Clarence A. O'Brien

Attorney

Dec. 15, 1942.  J. D. HASSETT  2,305,527
STEERING WHEEL SPINNER
Filed March 27, 1941  2 Sheets-Sheet 2

Inventor
James Dunlap Hassett

By Clarence A. O'Brien

Attorney

Patented Dec. 15, 1942

2,305,527

UNITED STATES PATENT OFFICE 2,305,527

STEERING WHEEL SPINNER

James Dunlap Hassett, Los Angeles, Calif.

Application March 27, 1941, Serial No. 385,531

1 Claim. (Cl. 74—557)

This invention relates to new and useful improvements in steering wheels for vehicles and more particularly therefor to permit spinning of an automobile steering wheel with more ease.

The principal object of the present invention is to provide a steering wheel spinner which can be readily mounted on conventional steering wheels with but a minimum of manual effort, and without in any manner requiring deformation of the conventional forms of steering wheels.

Another important object of the invention is to provide a steering wheel spinner which will have a swivelling action to the end that there will be no friction on the driver's hand when the spinner is used.

Other objects and advantages of the invention will become apparent to the reader of the following specification.

Figure 1:
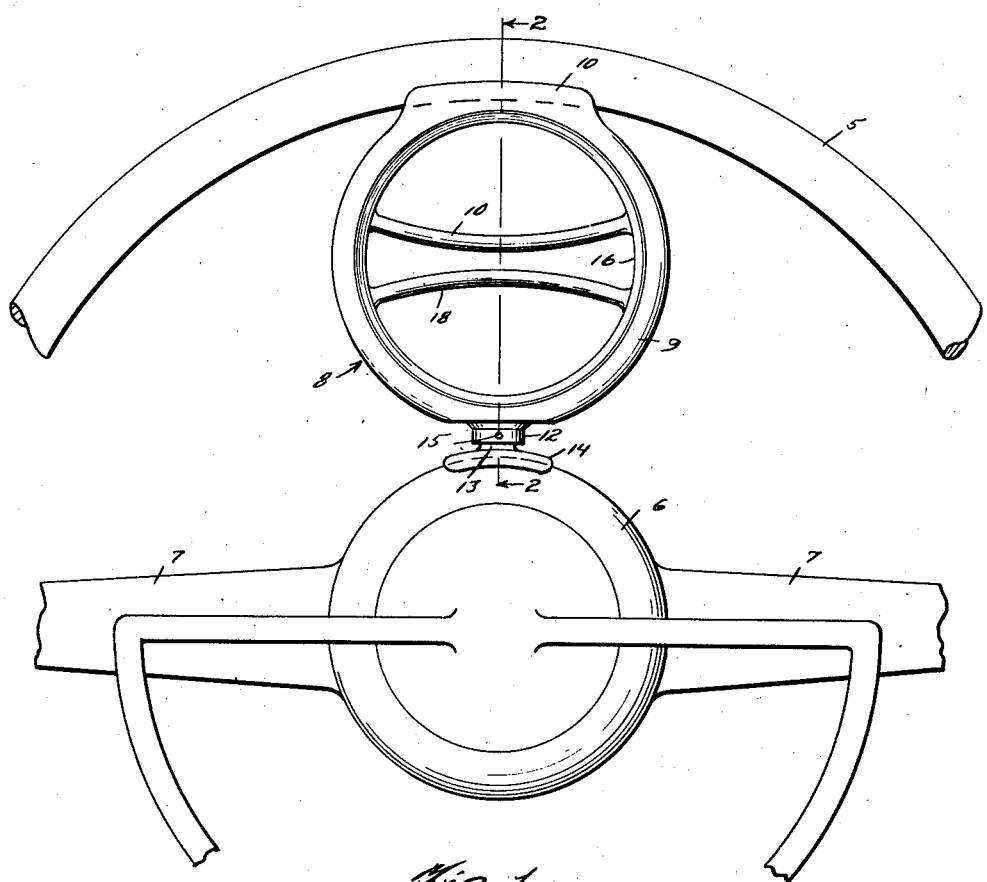
Figure 1 represents a fragmentary plan view showing one form of the present invention.
Figure 2:
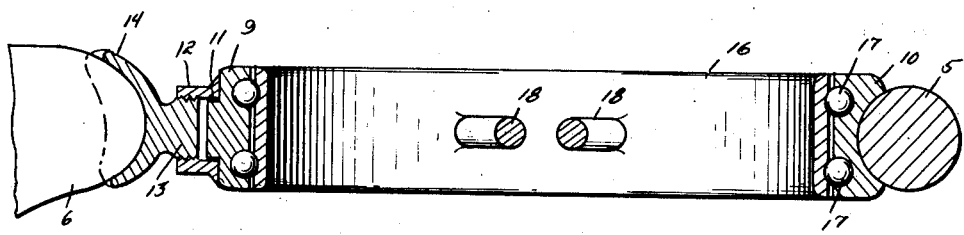
Figure 2 is an enlarged sectional view taken substantially on the line 2—2 of Figure 1.

Referring to the drawings wherein like numerals designate like parts, it can be seen in Figures 1 and 2, that numeral 5 denotes the steering wheel rim which is connected to a hub 6 by spokes 7, 7. Numeral 8 generally refers to the improved spinner, the same consisting of an annular bearing race 9 having an elongated channeled protrusion 10 for partly receiving a portion of the rim 5. As shown in Figure 1, the race 9 is provided with a cylindrical boss 11 protruding therefrom at a point diametrically opposite from the protrusion 10 and over this boss 11 is disposed a collar 12. The portion of the interior of the collar disposed over the boss 11 is smooth so that the collar can readily turn on the boss, while the remaining interior portion of the collar is threaded to accommodate threads on a neck 13 which protrudes from a longitudinal and transversely curved saddle 14, this saddle embracing a portion of the hub 6. The collar 12 has a spanner wrench receiving opening 15 therein. Obviously, by setting the race 9 properly between the rim 5 and the hub 6 and rotating the collar 12, the spinner can be positively retained in place.

The spinner further includes a ring 16 circumferentially grooved to accommodate ball-bearings or other bearing means 17 carried by the race 9. A pair of hand grip bars 18, 18 of curved formation extend adjacent each other across the ring 16, the intermediate portions of the bars 18 coming substantially close together.

Obviously, when the bars 18 are grasped by one hand of the driver in order to spin the steering wheel, the ring 16 will rotate or swivel in the race 9 as the steering wheel is rotated.

Figure 3:
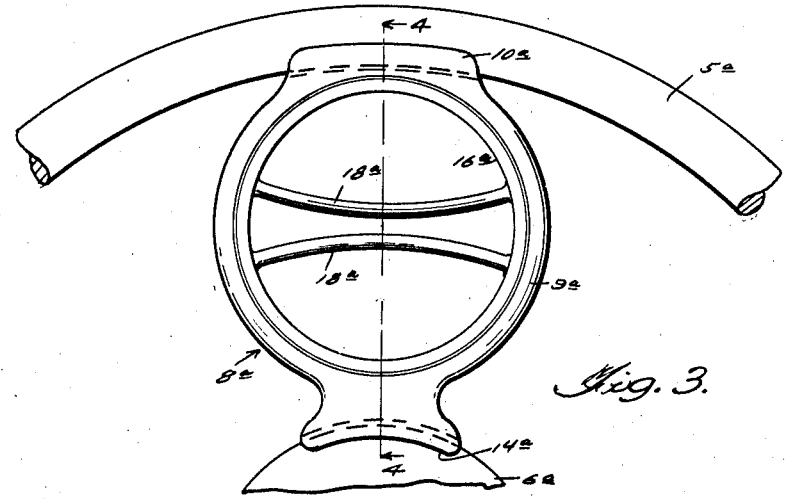
Figure 3 is a fragmentary plan view of a second form of the present invention.
Figure 4:
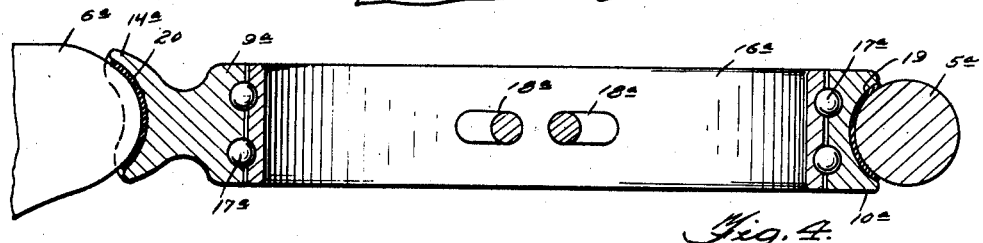
Figure 4 is an enlarged sectional view taken substantially on the line 4—4 of Figure 3.

A modification of the invention is shown in Figure 3 wherein an annular race 9a is employed and provided with a channeled protrusion 10a for embracing a steering wheel rim 5a and at a diametrically opposite point with a channeled saddle 14a projecting rigidly from the race 9a to embrace a portion of the steering wheel hub 6a. In the race 9a is a rotatable ring 16a bridged by hand grip bars 18a, 18a. The spinner 8a is assembled with respect to the wheel by springing the rim 5a, setting the spinner and then permitting the rim 5a to return to position and retain the spinner in positive position. Suitable bearing means 17a are provided between the ring 16a and the race 9a and to prevent slipping of the spinner, rubber liners 19, 20 are provided for the protrusion 10a and saddle 14a, respectively.

Figure 5:
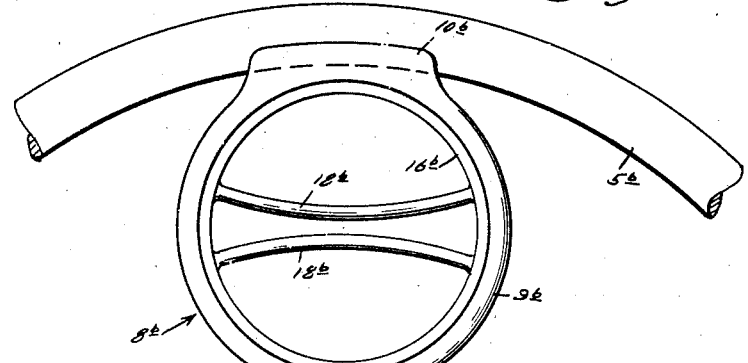
Figure 5 is a fragmentary plan view of a third form of the invention.
Figure 6:
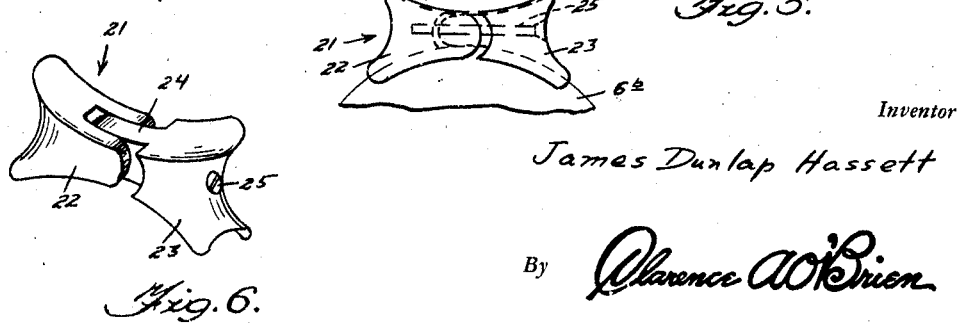
Figure 6 is a perspective view of the expansion unit used in conjunction with the form of the invention shown in Figure 5.

A third form of the invention is shown in Figure 5, reference character 5b denoting a steering wheel rim, while reference character 6b denotes a steering wheel hub and between these elements is interposed a spinner generally referred to by reference character 8b. This spinner consists of a race 9b having a protrusion 10b channeled to receive a portion of the rim 5b. Between a diametrically opposite point of the race 9b and the hub 6b is an expansion unit 21. This expansion unit consists of a pair of blocks 22, 23, the block 22 being bifurcated to receive a tongue 24 projecting from the block 23. The blocks are inwardly tapered on arcs and have their opposite side portions channeled to receive portions of the race 9b and hub 6b. A screw 25 is rotatably disposed through the block 23 and is threadedly engaged into the block 22. Obviously, by unscrewing the screw 25 the unit 21 can be easily set between the hub 6b and the race 9b, after which by feeding the screw 25 inwardly, the blocks 22, 23 are brought together and in expanding and abutting the hub 6b, tends to clamp the spinner 8b against the rim 5b.

The spinner 8b has a rotatable ring 16b mounted therein and spanning the ring 16b are hand grip bars 18b, 18b.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In combination with a steering wheel including a rim and a hub; a spinner for facilitating rotation of the steering wheel, said spinner being interposed between the hub and the rim, and an expansion unit between the hub and the spinner for clamping the spinner in positive position, said unit comprising a pair of tapered blocks interposed end to end between the hub and the spinner and groove for interfitting with the same, and means to variably clamp said blocks together.

JAMES DUNLAP HASSETT.